United States Patent [19]

Fujiyama

[11] Patent Number: 5,003,557

[45] Date of Patent: Mar. 26, 1991

[54] APPARATUS FOR RECEIVING DIGITAL SIGNAL

[75] Inventor: Tadataka Fujiyama, Tokyo, Japan

[73] Assignee: Sony Corporation, Tokyo, Japan

[21] Appl. No.: 409,700

[22] Filed: Sep. 20, 1989

[30] Foreign Application Priority Data

Sep. 20, 1988 [JP] Japan ................................. 63-235425

[51] Int. Cl.$^5$ ................................................. H04L 7/10
[52] U.S. Cl. ..................................... 375/108; 375/120; 381/2
[58] Field of Search ................. 375/108, 120; 329/308, 329/309, 325, 360; 360/32, 51; 331/10, 11, DIG. 2; 381/15, 2

[56] References Cited

U.S. PATENT DOCUMENTS

| 4,481,546 | 11/1984 | Ito et al. | 329/325 |
| 4,561,101 | 12/1985 | Pinsard et al. | 375/108 |
| 4,596,963 | 6/1986 | Lawton et al. | 331/DIG. 2 |
| 4,787,097 | 11/1988 | Rizzo | 331/DIG. 2 |
| 4,918,406 | 4/1990 | Baumbach et al. | 331/DIG. 2 |

Primary Examiner—Benedict V. Safourek
Attorney, Agent, or Firm—Lewis H. Eslinger

[57] ABSTRACT

A digital signal is received in which synchronization data is inserted at a predetermined period and in which a timing signal is synchronism with the synchronization data is developed from a digitally modulated input digital signal. A circuit generates detection signals indicative of a sampling frequency of the input digital signal on the basis of the synchronization data. A first window generating circuit generates signals of different frequency based on stable clock signals and uses the detecting signals to select one of the signals as a first reference signal. A second window generating circuit generates a second signal in synchronism with the synchronization data on the basis of an output signal from a phase-locked loop. A selector supplies the first reference signal to the phase-locked loop for a period during which the loop becomes stable and supplies the second reference signal to the phase-locked loop after expiration of the period, thereby enabling the generation of stable timing signals with respect to an input digital signal having different sampling frequencies.

9 Claims, 5 Drawing Sheets

APPARATUS FOR RECEIVING DIGITAL SIGNAL

BACKGROUND OF THE

1. Field of the Invention

The present invention relates, generally, to an apparatus for receiving digital signals and, more specifically, to developing system clock signals from a digital signal received via a digital audio interface, for instance.

2. Description of the Prior Art

Figure 1:
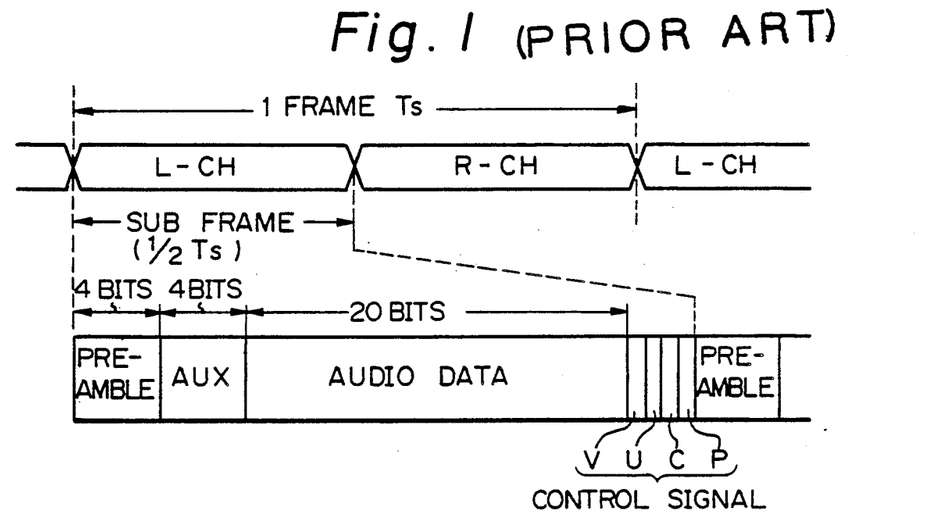
FIG. 1 is a diagrammatic representation of a format for a digital audio interface signal to which the present invention is applicable.

In commercial digital audio equipment a standardized interface for transmitting a digital audio signal has been proposed, and FIG. 1 represents a signal format of this digital audio interface. It is assumed that a period Ts, which is the inverse of the sampling frequency Fs of the digital audio signal, represents one frame. Data of the left channel is arranged in the first half period of the frame, while data of the right channel is arranged in the latter half period thereof. One half of the frame is called a subframe, and into this subframe 32 bits of data are inserted.

A four-bit preamble is positioned at the head of each subframe, four-bit auxiliary data AUX is then arranged, and 20-bit digital audio data is inserted next to the data AUX starting from its least significant bit (LSB). A four-bit control signal V, U, C, P is added after the audio data. The control signal (V: valid flag, U: user data, C: channel status, P: parity bit) is used to indicate whether data is valid or invalid, whether digital copying is prohibited, the sampling frequency, etc. Twenty-eight bits, except for the four-bit preamble, are subjected to bi-phase modulation, and the preamble is subjected to digital modulation by a method other than bi-phase modulation.

In an apparatus for receiving a digital signal having the above-described signal format, it is necessary to develop system clocks in synchronism with the reception signal using a phase-locked loop (PLL) in order to perform digital demodulation, data extraction, etc. Specifically, a signal with a frequency of 2Fs in synchronism with the preamble in the received digital signal is supplied to the PLL as a reference signal.

Figure 2:
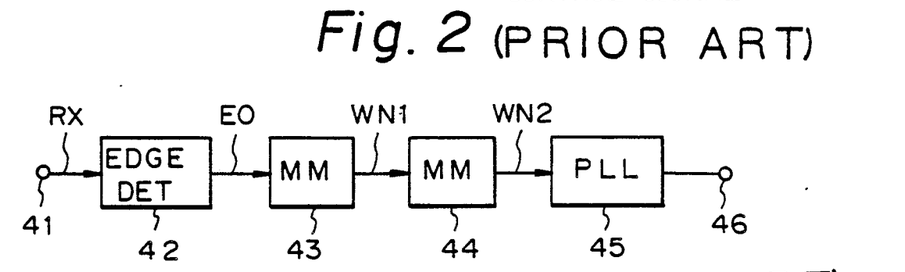
FIG. 2 is a schematic in block diagram form of a conventional apparatus for receiving a digital signal.
Figure 3:
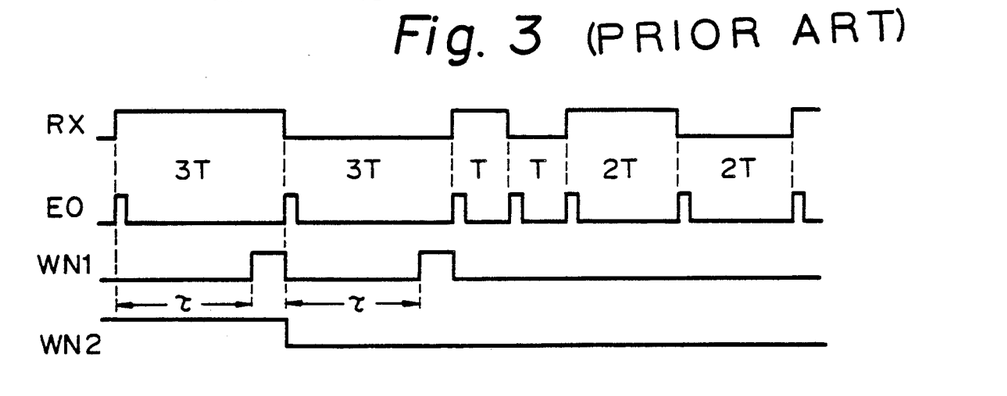
FIG. 3 is a timing chart useful for explaining the circuit of FIG. 2.

Conventionally, the reference signal for the PLL is developed from a received signal by a specialized circuit, such as the one shown in FIG. 2. FIG. 3 is a waveform diagram representing the timing of the signals in the circuit of FIG. 2.

In FIG. 2, an input terminal 41 receives a digital signal RX having a signal format of a digital audio interface. The input digital signal RX is supplied to an edge detector 42, and an edge pulse signal E0 in which pulses are respectively generated at the timing of the leading and trailing edges of the signal RX is produced.

The edge pulse signal E0 carrying leading and trailing edge information is supplied to a retriggerable monostable-multivibrator 43, which is triggered at the leading edge of the pulses in edge pulse signal E0, and a pulse signal WN1 is produced. The pulse signal WN1 is a signal having a low level for a period of time from the leading edge of the pulses in edge pulse signal E0. The output signal WN1 of multivibrator 43 is supplied to a second retriggerable monostable-multivibrator 44, and a pulse signal WN2 that has a low level for a predetermined period from the falling edge of the pulses in signal WN1 is generated. Signal WN2 has a frequency (2Fs) that is twice the sampling frequency Fs of the input digital signal, and is fed to a phase-locked loop (PLL) 45 as a reference signal. System clock signals in synchronism with the input digital signal RX are produced at an output terminal 46 of PLL 45.

The preamble of the input digital signal RX may have six kinds of bit patterns depending on the value (0 or 1) of the last symbol in an immediately preceding subframe and the method employed to send two-channel stereo. That is, a set of three preambles is used and the preamble preceding each digital audio sample should indicate the beginning of a sample: of channel A and of a block; of channel A and not a block; or of channel B, C, etc. but not A. A set of three different preambles is used to provide the six different bit patterns. In the example of a preamble in the signal RX as shown in FIG. 3, the inversion intervals are (3T, 3T, T, T). T is a time period derived as the inverse of the sampling frequency equal to 128 Fs. As a result, to develop a signal in synchronism with the digital signal RX, it is necessary to detect the 3T-period (pulse width) of the signal RX. In the circuit of FIG. 2, monostable multivibrator 43 detects this 3T-period.

There may be three different sampling frequencies Fs of the input digital signal RX, for example, 32 kHz, 44.1 kHz, 48 kHz. The pulse width of 2T in the case where Fs equals 44.1 kHz and the pulse width of 3T in the case where Fs equals 48 kHz are comparatively close values. For this reason, in the conventional structure for determining both of them using the time constant of the monostable multivibrator, there is a possibility that a preamble can be erroneously detected due to variations of values of components, and value changes due to temperature variations, for example. Also, the conventional approach described above using a number of monostable-multivibrators is not suited for integrated circuit (IC) fabrication.

OBJECTS AND SUMMARY OF THE INVENTION

Accordingly, it is an object of the present invention to provide an apparatus for receiving a digital signal and producing a timing signal that can eliminate the above-noted defects inherent in the previously proposed systems.

Another object of the present invention is to provide an apparatus for receiving a digital signal and generating a stable timing signal in synchronism with the sampling frequency of the input signal, in which the apparatus is suited for integrated circuit (IC) fabrication.

In accordance with an aspect of the present invention, the above objects are accomplished by an apparatus for receiving a digital signal in which synchronization data is inserted at a predetermined period and a timing signal in synchronism with the synchronization data is developed from a digitally modulated input signal RX. Such apparatus includes a circuit for generating detection signals indicative of a sampling frequency of the input digital signal RX, on the basis of the synchronization data. A first signal generating circuit is provided that generates signals having plural frequencies based on stable clock signals and selects one of the signals as a first reference signal by using the detection signals. A second signal generating circuit generates a second reference signal that is in synchronism with the synchronization data on the basis of an output signal from a phase-locked loop circuit, and a switching circuit supplies the first reference signal to the phase-locked loop for a period in which the phase-locked loop becomes stable and supplies the second reference signal to the phase-locked after lapse of that period.

Three different sampling frequencies Fs, for example, 48 kHz, 44.1 kHz, and 32 kHz of the input digital signal RX may be considered. A maximum-inversion interval detector measures the length of the maximum-inversion interval by clock signals formed by a clock generator. The sampling frequency Fs is judged, and the detection signals are developed.

A window generating circuit generates one signal in the case where Fs equals 48 kHz or 44.1 kHz and another signal in the case where Fs equals 32 kHz from the stable clock signal, and one of the signals is selected using the detection signals to provide the reference signal.

The window generating circuit forms the reference signal from the output signal of the phase-locked loop. At the time the phase-locked loop starts, the reference signal is selected and supplied to the phase-locked loop. After the phase-locked loop is locked to the reference signal, a selector is operated, and the reference signal is supplied to the phase-locked loop.

As a result, the period length 3T in a preamble of the input digital signal is detected by the stable clock signals, and the sampling frequency Fs is determined. No deterioration of accuracy is seen in the time constant of the monostable multivibrator. Also, because no monostable multivibrator is employed in this embodiment, it is suited for integrated circuit fabrication.

The above and other objects, features, and advantages of the present invention will become readily apparent from the following detailed description thereof which is to be read in connection with the accompanying drawings, in which like reference numerals represent the same or similar elements.

BRIEF DESCRIPTION OF THE DRAWINGS

FIGS. 7A–7I are timing charts useful in explaining the operation of the window generating circuits of FIGS. 5 and 6;

FIGS. 9A–9E are timing charts useful in explaining the operation of the window generating circuit of FIG. 8.

DETAILED DESCRIPTION OF PREFERRED EMBODIMENTS

Figure 4:
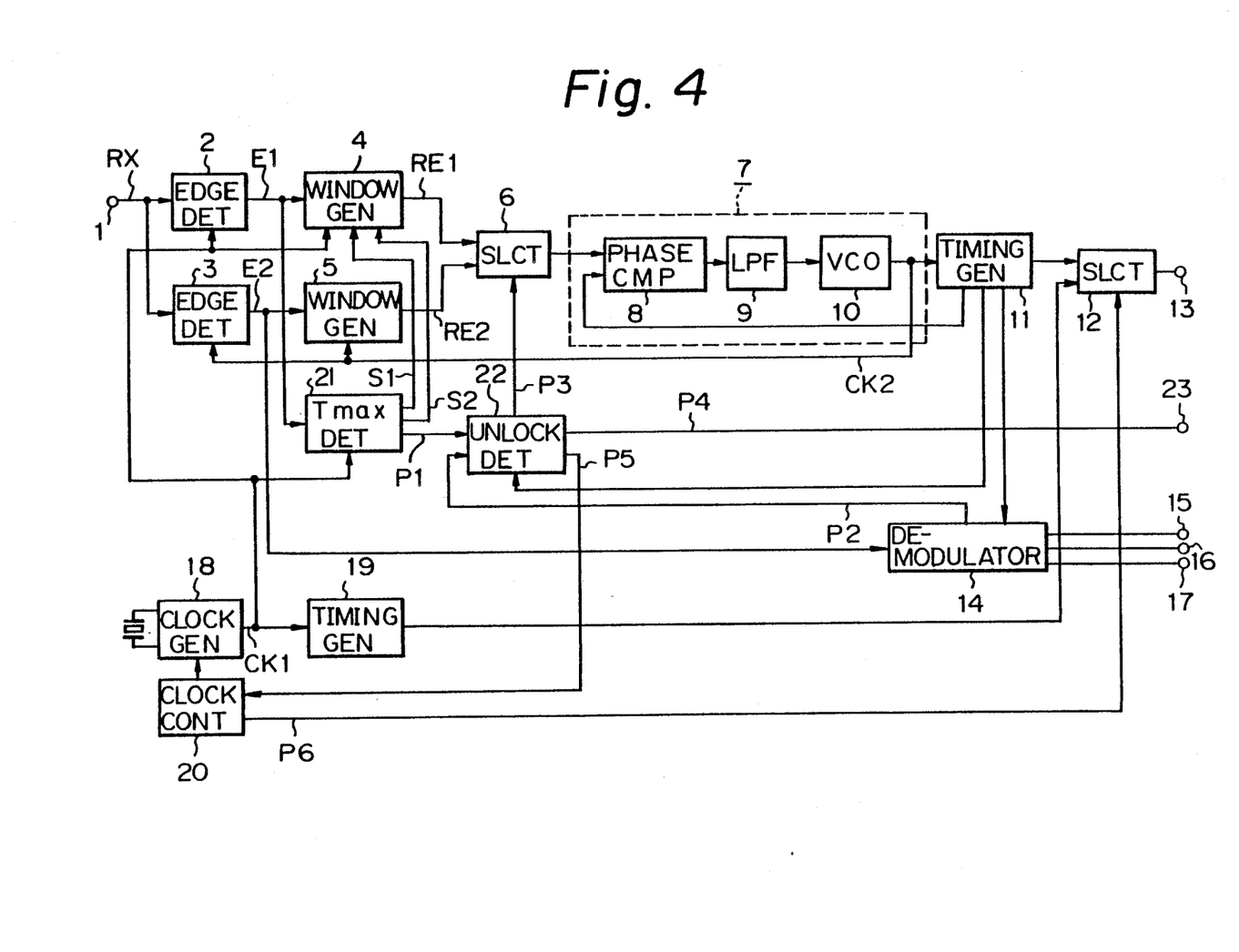
FIG. 4 is a schematic in block diagram form of an embodiment of the present invention.

In FIG. 4, a digital signal RX having a signal format of a digital audio interface is supplied to an input terminal 1 and fed to two edge detectors 2 and 3. An edge pulse signal E1 from edge detector 2 is fed to a window generating circuit 4 and to a maximum-inversion interval (Tmax) detector 21. Similarly, an edge pulse signal E2 from edge detector 3 is supplied to a second window generating circuit 5 and to a demodulator 14. Demodulator 14 operates to perform bi-phase demodulation.

A reference signal RE1 output from window generating circuit 4 or a reference signal RE2 output from window generating circuit 5 is selected by a selector 6 and is fed to a phase comparator 8 of a phase-locked loop (PLL) 7. PLL 7 has a voltage controlled oscillator (VCO) 10 that receives the output signal from phase comparator 8 as a control voltage through a low-pass filter 9. The output of VCO 10 is a clock signal CK2 that is supplied to edge detector 3, to window generating circuit 4, and to a timing generator 11. In addition, the output signal of timing generator 11 is fed to another selector 12. In this way, a clock signal that is in synchronism with the input digital signal RX is produced at an output terminal 13 of selector 12.

Demodulator 14 receives a timing signal from timing generator 11, and the demodulated received data is made available at output terminals 15, 16, 17 of demodulator 14. More specifically, audio data and a control signal are provided at output terminal 15; a signal with a subframe period is produced at output terminal 16; and a signal with a 192-frame period is provided at output terminal 17.

A clock generator 18 generates a stable clock signal CK1 by using a crystal oscillator, and clock signal CK1 is supplied to edge detector 2, to window generating circuit 4, to maximum-inversion interval detector 21, and to a second timing generator 19. The output signal of timing generator 19 is supplied to selector 12. The ON-OFF control of a clock generation operation for clock signal CK1 in clock generator 18 is done by a control signal from a clock control circuit 20, and selector 12 is controlled by a control signal P6 from clock control circuit 20.

Maximum-inversion interval detector 21 determines the sampling frequency Fs of the input digital signal RX and generates detection signals S1 and S2 indicating whether the sampling frequency Fs is 32 kHz, 44.1 kHz, or 48 kHz. When the sampling frequency Fs cannot be determined, an error signal P1 is produced and is fed to an, unlocked-state detector 22. When a demodulation error is detected, an error signal P2 indicative of a demodulation error is fed to unlocked-state detector 22 from demodulator 14. In response to error signal P1 or P2, unlocked-state detector 22 generates a control signal P3 that controls selector 6. In addition, detector 22 produces a muting signal indicative of an unlocked-state that is available at another output terminal 23.

Furthermore, detector 22 produces a signal P5 that is fed to clock control circuit 20, so that clock generator 18 is controlled to perform a clock generating operation when PLL 7 is in the unlocked-state. When the PLL 7 is in a locked-state, the clock generator 18 is controlled to stop the clock generating operation.

In response to the control signal P3 generated by unlocked-state detector 22, selector 6 selects the reference signal RE1 for use in starting during an early period in which reception data is input until PLL 7 is brought into a locked-state.

Selector 6 also uses control signal P3 to select the reference signal RE1 for starting when the maximum-inversion interval is not detected correctly, and also when a demodulation error occurs. Selector 6 selects the reference signal RE2 in all cases other than the above-mentioned ones. The error signal P2 cannot be accepted in a period until PLL 7 is brought into a locked-state.

At maximum-inversion interval detector 21, intervals of sixty-four continuous edge pulses E1 are respectively measured by the number of the clock signals CK1 using a counter. Because there is at least one 3T-interval in the 64 pulses, the detection is accomplished so that the maximum interval is 3T. By the detected 3T-interval, that is, the count value of the counter, the sampling frequency Fs of the input digital signal RX is determined. In the case where the frequency of the clock signal CK1 is 18.432 MHz, for example, this determination is made as follows:

(1) Count value=7~10 Fs=44.1 kHz~48 kHz; and
(2) Count value=11~14 Fs=32 Khz.

Depending on this determination, the detection signals S1 and S2 are generated. When the count value assumes a value other than one of these values, the determination is made to indicate an error, and the error signal P1 is produced.

Figure 5:
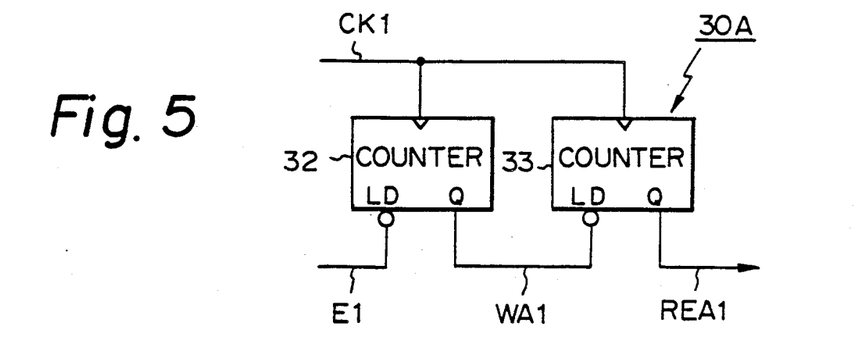
FIG. 5 is a schematic in block diagram form of one embodiment of a window generating circuit used in the circuit of FIG. 4.
Figure 6:
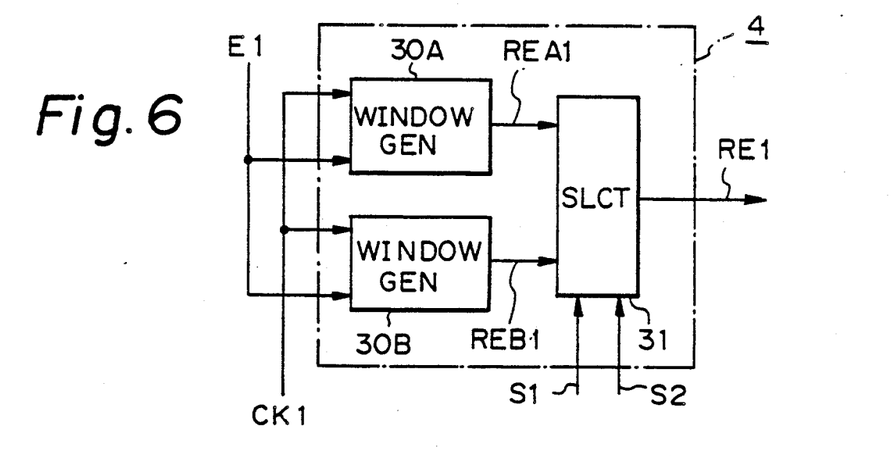
FIG. 6 is a schematic in block diagram form of another embodiment of a window generating circuit according to the present invention.

Window generating circuit 4 of FIG. 4 is composed of two window generating circuits 30A and 30B shown in FIG. 6. The window generating circuits 30A and 30B are identical and are made up of counters 32 and 33, as shown in FIG. 5. The clock signal CK1 developed at clock generator 18 is supplied to the counters 32 and 33 as a clock input. The edge pulse signal E1 is fed to counter 32 as a load pulse, and zero data is loaded into the counter 32 at the leading edge of a pulse in edge pulse signal E1, for example. A window signal WA1 is generated when counter 32 counts seven clock pulses in signal CK1 from the time of the load command. The window signal is fed to counter 33 as a load pulse, and counter 33 generates a signal REA1 at a low level for a period in which counter 33 starts counting the pulses of clock signal CK1 from the rising edge of a pulse of window signal WA1 up to a predetermined number.

A signal REB1 is developed by window generating circuit 30B that is constructed the same as window generating circuit 30A. These signals REA1 and REB1 are fed to a selector 31, and one of the input signals is output as the reference signal RE1. Selector 31 is controlled by the detection signals S1 and S2 from maximum-inversion interval detector 21. When the sampling frequency Fs of the input signal Rx is 48 kHz or 44.1 kHz, the REA1 output from window generating circuit 30A is selected by selector 31, whereas when the sampling frequency is 32 kHz, the signal REB1 output from window generating circuit 30B is selected by selector 31.

Figures 7A, 7B:
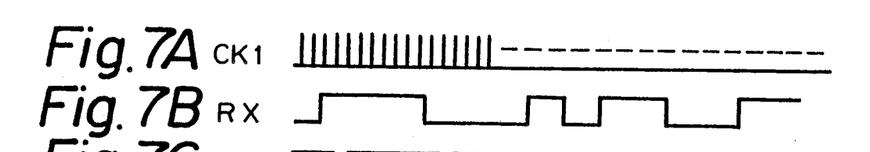
Figures 7C, 7D:
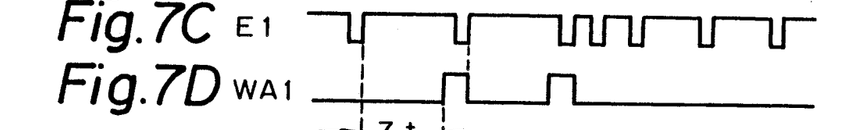

Referring to the timing chart shown in FIGS. 7A–7I, the operation of the window generating circuits 30A and 30B is explained. FIG. 7A represents the clock signals CK1, and FIG. 7B indicates the preamble portion of the signal RX, Fs=48 kHz or 44.1 kHz. The edge pulse signal E1 represented in FIG. 7C is generated by edge detector 2.

Figure 7E:
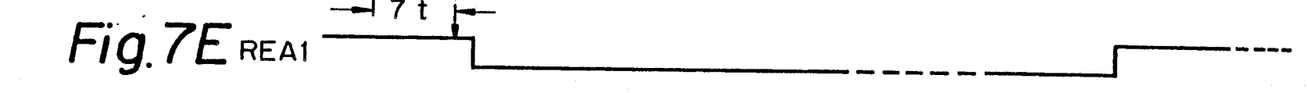

Counter 32 of window generating circuit 30A generates the window signal WA1 represented in FIG. 7D, which rises after the lapse of the 7t-period, where t is a period of the clock signals CK1 when the counter has counted seven clock signals CK1 after the rise of a pulse in edge pulse signal E1. The signal REA1 represented in FIG. 7E has a low level during the period in which a predetermined number of clock signals CK1, for example, 256, are counted by counter 33 loaded with this window signal WA1.

Figures 7F, 7G, 7H:
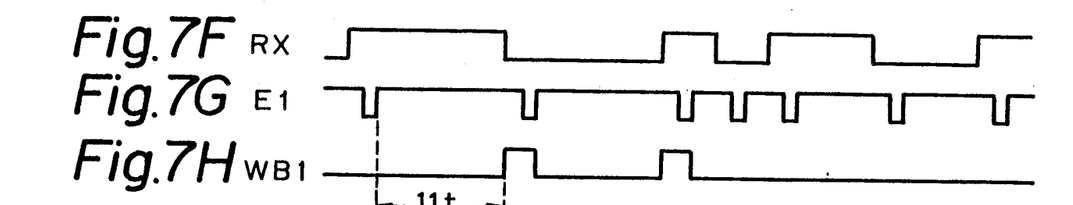
Figure 7I:
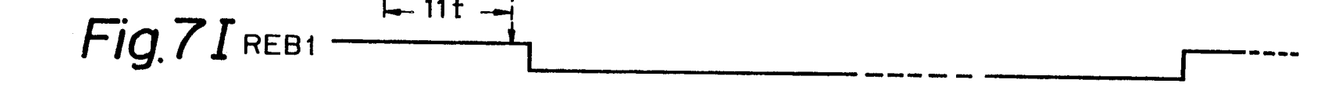

The case of the input digital signal RX having Fs=32 kHz is shown in FIG. 7F, in which the edge pulse E1 indicated in FIG. 7G is produced. A window signal WB1 represented in FIG. 7H, which assumes a low level for a period of 11t from the trailing of the edge pulse E1, is generated by window generating circuit 30B. The signal REB1 represented in FIG. 7I is formed by the window signal WB1.

As described above, window generating circuit 4 generates the reference signal RE1 for starting corresponding to each of the plural sampling frequencies of the input digital signal RX based on the clock signals.

Figure 8:
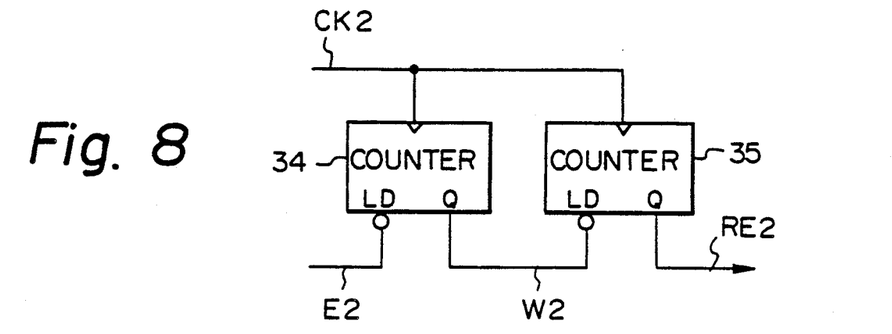
FIG. 8 is a schematic in block diagram form of another embodiment of a window generating circuit according to the present invention.

Window generating circuit 5 of FIG. 4 is composed of counters 34 and 35 as shown in FIG. 8, in which counter 34 is loaded by an edge pulse signal E2 and counts clock signals CK2 formed by PLL 7. A window signal W2 generated by counter 34 is supplied to counter 35 as a load pulse, and the reference signal RE2, which is a division of the clock signal CK2, is output from counter 35.

Figures 9A, 9B:
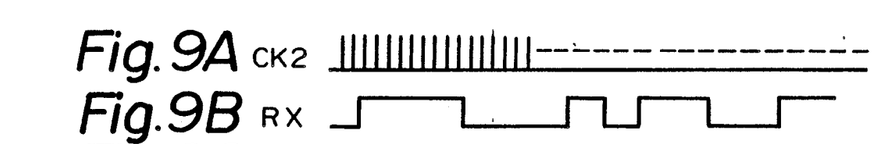
Figures 9C, 9D, 9E:
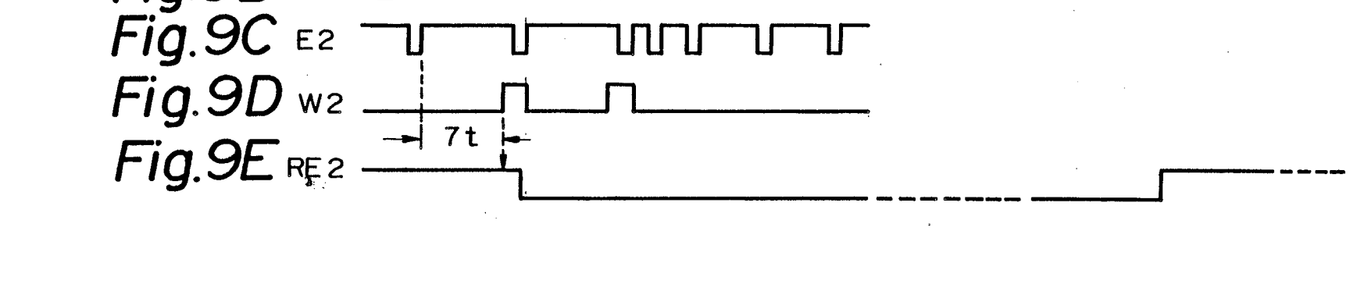

FIGS. 9A–9E are timing charts useful in explaining the operation of window generating circuit 5 of FIG. 4. FIG. 9A represents the clock signal CK2, FIG. 9B represents the input digital signal RX where the sampling frequency $F_s$ is 48 kHz or 44.1 kHz, and FIG. 9C represents the edge pulse E2. As shown in FIG. 9D, the window signal W2 is developed by counting seven pulses of clock signal CK2 in counter 18. In the case where the sampling frequency of the signal RX is 32 kHz, the frequency of the clock signal CK2 is lowered. The window signal W2 is supplied to counter 35, and the reference signal RE2 is developed.

Because window generating circuit 5 produces the reference signal RE2 from the clock signal CK2 formed by PLL 7, the reference signal RE2 is in synchronism with the input digital signal RX.

Selector 6 selects the first reference signal RE1 from window generating circuit 4 in the initial state for starting PLL 7. The reference signal RE1 is selected for a period of time until PLL 7 locks. The error signal P2 indicating a demodulation error generated in the period cannot be accepted.

After PLL 7 has been locked to the reference signal RE1, selector 6 is switched to select the second reference signal RE2 from window generating circuit 5. In addition, to prevent the generation of beats, the generation of the clock signals CK1 from clock generator 18 is turned off by clock control circuit 20. Because VCO 10 of PLL 7 oscillates with almost the same frequency as the sampling frequency Fs of the input digital signal RX by the reference signal RE1, PLL 7 is quickly locked to the reference signal RE2. The error signal P2 cannot be accepted even in a predetermined period immediately after the switching of selector 6.

Even if the reference signal RE2 assumes a state where the reference signal RE2 is supplied to PLL 7, the operation returns to the start stage when the error signal P1 from maximum-inversion interval detector 21 and the error signal P2 from demodulator 14 are generated. More specifically, the generating operation of the clock signal CK1 from clock generator 18 is started, and the detection of the maximum-inversion interval generation of the reference signal RE1.

The present invention decides the sampling frequency Fs from a preamble of the input digital signal RX using a stable clock signal CK1 to provide the reference signal RE1 of frequency depending on the frequency Fs. Therefore, any errors due to temperature variation, etc. as in the time constant of a monostable multivibrator, are unlikely, and a reference signal correctly corresponding to the input digital signal RX can be supplied to the phase-locked loop. In addition, since the reference signal RE1 is fed to the phase-locked loop at the beginning and since the reference signal RE2 is fed after an elapse of a predetermined period, the locking of the phase-locked loop becomes stable. Furthermore the present invention has a structure suited for integrated circuit fabrication because no monostable multivibrator is employed.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention, as defined in the appended claims.

What is claimed is:

1. Apparatus for receiving a modulated input digital signal having synchronization data inserted at predetermined intervals and including a timing signal in synchronism with the synchronization data and developed from the modulated input digital signal, said apparatus comprising:

means responsive to said synchronization data for generating detection signals that indicate a sampling frequency of said modulated input digital signal and for generating a first error signal upon failure to detect said sampling frequency;

first signal generating means for generating signals having selected frequencies and selecting one of the generated signals as a first reference signal in response to said detection signals;

a phase-locked loop;

second signal generating means responsive to an output signal of said phase-locked loop for generating, as an output, a second reference signal in synchronism with said synchronization data;

means responsive to said modulated input digital signal for producing a demodulated signal and for producing a second error signal in case of a demodulation error; and switching means responsive to said first and second error signals for supplying said first reference signal to said phase-locked loop in case of failure to detect said sampling frequency or in case of a demodulation error and otherwise normally supplying said second reference signal to said phase-locked loop.

2. Apparatus according to claim 1, wherein said modulated input digital signal contains two audio samples within one sampling period.

3. Apparatus according to claim 1, wherein said modulated input digital signal undergoes a series of inversions during a plurality of inversion intervals and said means for generating detection signals includes means for detecting a maximum-inversion interval in said modulated input digital signal and producing a maximum-inversion interval output signal fed to said first signal generating means.

4. Apparatus according to claim 1, wherein said first signal generating means includes a stable clock signal generator producing said signals having selected frequencies.

5. Apparatus according to claim 4, further comprising a clock control circuit and an unlocked state detector receiving a detection signal from said means for generating detection signals, whereby said clock generator is turned off by said clock control circuit in response to a signal from said unlocked state detector when said phase-locked loop is in a locked condition.

6. Apparatus for receiving a modulated input digital signal having synchronization data at predetermined intervals and a timing signal in synchronism with the synchronization data, said apparatus comprising:

detection means responsive to said synchronization data for generating a plurality of detection signals that indicate a sampling frequency of said modulated input digital signal and for generating a first error signal upon failure to detect said sampling frequency;

first signal generating means for generating signals having selected frequencies and producing as an output one of the generated signals as a first reference signal in response to said detection signals indicative of the sampling frequency of the input signal;

a phase-locked loop;

second signal generating means responsive to an output signal of said phase-locked loop for generating, as an output, a second reference signal in synchronism with said synchronization data;

means responsive to said modulated input digital signal for producing a demodulated signal and for producing a second error signal in case of a demodulation error; and selector means responsive to said first and second error signals for selectively supplying said first reference signal to said phase-locked loop in case of a failure to detect sad sampling frequency or in case of a demodulation error and otherwise normally supplying said second reference signal to said phase-locked loop.

7. Apparatus according to claim 6, wherein said modulated input digital signal undergoes a series of inversions during plurality of inversion intervals and said means for generating detection signals generates as one of said plurality of detection signals a signal indicating a maximum-inversion interval in said input digital signal.

8. Apparatus according to claim 7, wherein said first signal generating means includes a clock signal generator producing said signals having selected frequencies.

9. Apparatus according to claim 8, further comprising a clock signal generator control circuit and a state detector, said state detector receiving a detection signal indicating the locked state of said phase-locked loop from said detection means, whereby said clock signal generator is stopped by said clock signal generator control circuit in response to a signal from state detector when said phase-locked loop is in a locked condition.

* * * * *

UNITED STATES PATENT AND TRADEMARK OFFICE
CERTIFICATE OF CORRECTION

PATENT NO. : 5,003,557
DATED : March 26, 1991
INVENTOR(S) : Tadataka Fujiyama It is certified that error appears in the above-identified patent and that said Letters Patent is hereby corrected as shown below:

```
In the Abstract, line 3, change "is" to --in--
Col. 1, line 3, after "THE" insert --INVENTION--
        line 59, after "time" insert -- ( -- line 45, after "an" delete ","

Col. 8, line 40, change "sad" to --said--
```

Signed and Sealed this

Second Day of March, 1993

*Attest:*

STEPHEN G. KUNIN

*Attesting Officer*     *Acting Commissioner of Patents and Trademarks*